US011381692B2

(12) United States Patent
Ozawa

(10) Patent No.: US 11,381,692 B2
(45) Date of Patent: Jul. 5, 2022

(54) IMAGE FORMING SYSTEM, MANAGEMENT SERVER, AND RECORDING MATERIAL INFORMATION DETECTING APPARATUS

(71) Applicant: Konica Minolta, Inc., Tokyo (JP)

(72) Inventor: Fusako Ozawa, Hachioji (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 17/326,881

(22) Filed: May 21, 2021

(65) Prior Publication Data

US 2021/0385342 A1 Dec. 9, 2021

(30) Foreign Application Priority Data

Jun. 9, 2020 (JP) ............................ JP2020-099991

(51) Int. Cl.
*H04N 1/46* (2006.01)
*H04N 1/00* (2006.01)
*G06F 3/12* (2006.01)

(52) U.S. Cl.
CPC ....... *H04N 1/00244* (2013.01); *G06F 3/1237* (2013.01); *G06F 3/1288* (2013.01)

(58) Field of Classification Search
CPC .............. H04N 1/00244; H04N 1/6091; G06F 3/1288; G03G 21/20
USPC ........................ 358/1.15, 1.9; 399/44, 94, 97
See application file for complete search history.

(56) References Cited

U.S. PATENT DOCUMENTS

2013/0270338 A1* 10/2013 Kielland ............... G06F 3/1297 235/375

FOREIGN PATENT DOCUMENTS

JP 2015-176399 A 10/2015

* cited by examiner

*Primary Examiner* — Jamares Q Washington
(74) *Attorney, Agent, or Firm* — Squire Patton Boggs (US) LLP

(57) ABSTRACT

An image forming system includes: a recording material information detecting apparatus; an image forming apparatus; and a management server, wherein the recording material information detecting apparatus includes: a first hardware processor that detects recording material characteristic information; and a second hardware processor that acquires first environmental information, the image forming apparatus includes: an image former that forms an image on a second recording material; a third hardware processor that acquires second environmental information; a fourth hardware processor that transmits the second environmental information to the management server and requests the recording material characteristic information corresponding to the second environmental information; and a fifth hardware processor that sets an image formation condition for the image former to form the image on the second recording material, and the management server includes a sixth hardware processor.

18 Claims, 9 Drawing Sheets

1
4 PAPER INFORMATION DETECTING APPARATUS
41 CONTROLLER
41a CPU
41b ROM
41c RAM
42 PAPER SENSOR
43 ENVIRONMENT SENSOR
44 STORAGE APPARATUS
45 COMMUNICATION I/F
46, 11 OPERATION DISPLAY
5 MANAGEMENT SERVER
51 CONTROLLER
51a CPU
51b ROM
51c RAM
52 STORAGE APPARATUS
53 COMMUNICATION I/F
10 IMAGE FORMING APPARATUS
31 COMMUNICATION I/F
11 OPERATION DISPLAY
14 IMAGE FORMER
23 ENVIRONMENT SENSOR
32 CONTROLLER
32a CPU
32b ROM
32c RAM
33 STORAGE APPARATUS

1

IMAGE FORMING SYSTEM, MANAGEMENT SERVER, AND RECORDING MATERIAL INFORMATION DETECTING APPARATUS

The entire disclosure of Japanese patent Application No. 2020-099991, filed on Jun. 9, 2020, is incorporated herein by reference in its entirety.

BACKGROUND

Technological Field

The present invention relates to an image forming system, a management server, and a recording material information detecting apparatus.

Description of the Related Art

There has been provided an image forming apparatus that includes a media sensor, which detects paper information on paper, attached therein, determines an image formation condition in accordance with the paper information detected by the media sensor, and forms an image on the paper. A conventional media sensor has been generally configured in-line in a transport path of an image forming apparatus. In recent years, a media sensor provided offline outside an image forming apparatus has been used.

For example, Japanese Patent Application Laid-Open No. 2015-176399 discloses a technique of sequentially registering paper information in a server from an independent offline media sensor via a personal computer (PC) while giving a server an inquiry about paper information for a paper type when only the paper type of paper set in a plurality of image forming apparatuses is input. The image forming apparatus can execute a job under an image formation condition in accordance with the paper information acquired from the server.

In the technique disclosed in Japanese Patent Application Laid-Open No. 2015-176399, paper information detected by a plurality of media sensors placed in different environments may be sent to a server. Even if the types of paper set in each media sensor are the same, image formation conditions needs to be different if the installation environments of media sensors are different. The server, however, does not manage the installation environments of the media sensor and the image forming apparatus. As a result, if paper type information acquired by the image forming apparatus from the server is not suitable for the installation environment of the image forming apparatus, the image forming apparatus cannot set an appropriate image formation condition, which has sometimes caused defects on an image formed on the paper.

SUMMARY

The invention has been made in view of such a situation, and an object thereof is to enable even an image forming apparatus having no function of detecting the characteristics of a recording material to set an appropriate image formation condition.

To achieve the abovementioned object, according to an aspect of the present invention, an image forming system reflecting one aspect of the present invention comprises: a recording material information detecting apparatus; an image forming apparatus; and a management server, which are connected with each other via a network, wherein the recording material information detecting apparatus includes: a first hardware processor that detects recording material characteristic information representing a characteristic of a first recording material from the first recording material; and a second hardware processor that acquires first environmental information representing an environment in which the recording material information detecting apparatus is installed, the image forming apparatus includes: an image former that forms an image on a second recording material different from the first recording material; a third hardware processor that acquires second environmental information representing an environment in which the image forming apparatus is installed; a fourth hardware processor that transmits the second environmental information to the management server and requests the recording material characteristic information corresponding to the second environmental information; and a fifth hardware processor that sets an image formation condition for the image former to form the image on the second recording material based on the recording material characteristic information acquired from the management server, and the management server includes a sixth hardware processor that associates and manages the recording material characteristic information and the first environmental information received from the recording material information detecting apparatus, and, when receiving the second environmental information together with a request for acquiring the recording material characteristic information from the image forming apparatus, transmits the recording material characteristic information, which is the first environmental information corresponding to the second environmental information and associated with the first environmental information, to the image forming apparatus.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF EMBODIMENTS

Hereinafter, one or more embodiments of the present invention will be described with reference to the drawings. However, the scope of the invention is not limited to the disclosed embodiments. In the present specification and drawings, components having substantially the same function or configuration are designated by the same signs, and duplicate description will be omitted.

First Embodiment

Figure 1:
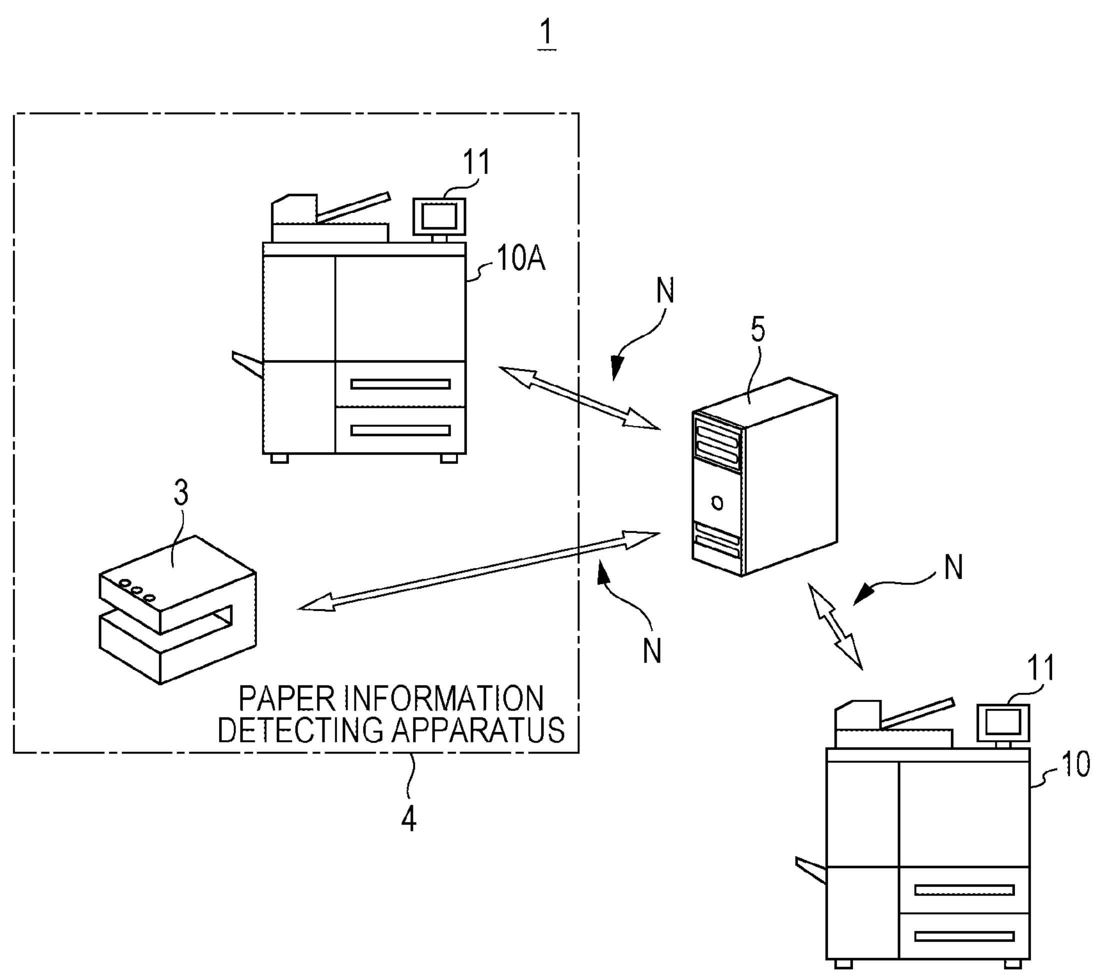
FIG. 1 is a schematic diagram illustrating an example of the entire configuration of an image forming system according to a first embodiment of the invention.

FIG. 1 is a schematic diagram illustrating an example of the entire configuration of an image forming system 1 according to a first embodiment of the invention.

The image forming system 1 includes a paper information detecting apparatus 4, a management server 5, and an image forming apparatus 10. The paper information detecting apparatus 4 and the management server 5 are connected via a network N, and can transmit and receive data to and from each other. The management server 5 and the image forming apparatus 10 are also connected via the network N, and can transmit and receive data to and from each other.

The network N may be a local area network (LAN) and a wide area network (WAN), and may include a telephone line network, a broadband communication line network, a leased line, a mobile communication network, a communication satellite line, a community antenna television (CATV) line, an optical communication line, and a wireless communication line.

The paper information detecting apparatus 4 (one example of recording material information detecting apparatus) detects paper information on paper. The paper on which the paper information detecting apparatus 4 detects paper information is one example of a first recording material. In contrast, paper on which the image forming apparatus 10 forms an image is one example of a second recording material. The image forming apparatus 10 can also form an image on a resin sheet. The first and second recording materials may be used as resin sheets. In the following description, paper may be referred to as the first recording material or the second recording material in order to clarify paper to be handled and information related to the paper.

In the embodiment, either a media detecting apparatus 3 or an image forming apparatus 10A including a paper sensor 42 (see FIG. 3) that detects paper characteristic information is used as the paper information detecting apparatus 4. The media detecting apparatus 3 and the image forming apparatus 10A used as the paper information detecting apparatus 4 acquire information on installation environments in which the media detecting apparatus 3 and the image forming apparatus 10A themselves are installed as environmental information. In the following description, in order to clarify the environmental information acquired in the environment in which each apparatus is installed, the environmental information may be described as first environmental information or second environmental information. Here, the first environmental information represents information on the environment in which the paper information detecting apparatus 4 is installed. The second environmental information represents information on the environment in which the image forming apparatus 10 is installed.

The media detecting apparatus 3 is used near, for example, an image forming apparatus (not illustrated) to which the media detecting apparatus 3 is externally attached or a PC that instructs the image forming apparatus to execute a job. The media detecting apparatus 3 detects paper characteristic information on paper and environmental information, and further acquires paper type information representing the type of the paper. In the following description, the paper characteristic information, the environmental information, and the paper type information are collectively referred to as "paper information". Paper information acquired by the paper information detecting apparatus 4 is transmitted to the management server 5 via a communication line such as a LAN and the Internet.

The image forming apparatuses 10 and 10A form an image of print data contained in a job in accordance with an instruction from an operation display 11 provided on the image forming apparatuses 10 and 10A, and prints the image on paper. For example, a copier, a printer, a facsimile, and a multifunction apparatus having these functions can be applied as the image forming apparatuses 10 and 10A.

Note that, in the embodiment, the image forming apparatus 10 does not include the paper sensor 42 inside. The paper sensor 42 or media detecting apparatus 3 are also not externally attached to the image forming apparatus 10. In contrast, the image forming apparatus 10A includes the paper sensor 42 inside. The image forming apparatus 10A passes paper housed in a paper feed tray 13*a* (see FIG. 2 described later) through a transport path 20, and causes the inside paper sensor 42 to detect the paper information on the paper.

The management server 5 accumulates and manages the paper information received from the paper information detecting apparatus 4. The management server 5 receives the environmental information acquired by the image forming apparatus 10 together with a request for acquiring paper characteristic information from the image forming apparatus 10 that does not have the paper sensor 42. The management server 5 transmits the paper characteristic information that matches the environmental information received from the image forming apparatus 10 to the image forming apparatus 10. The image forming apparatus 10 forms an image on paper under an image formation condition set based on the paper characteristic information received from the management server 5.

<Example of Hardware Configuration of Image Forming Apparatus>

An example of the hardware configuration of the image forming apparatus 10 will now be described.

Figure 2:
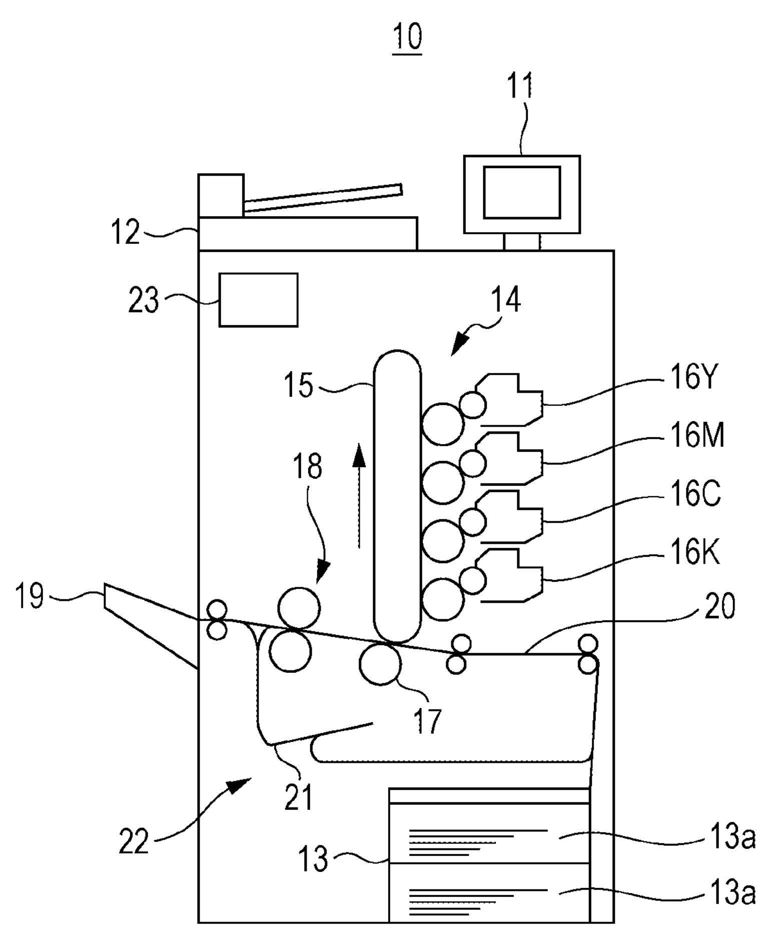
FIG. 2 is a schematic diagram illustrating an example of the hardware configuration of an image forming apparatus according to the first embodiment of the invention.

FIG. 2 is a schematic diagram illustrating an example of the hardware configuration of the image forming apparatus 10. Note that only a part of the image forming apparatus 10A different from the image forming apparatus 10 will be described. The image forming apparatus 10A has a hardware configuration similar to that of the image forming apparatus 10.

The image forming apparatus 10 adopts an electrophotographic method, in which an image is formed by static electricity. The image forming apparatus 10 is, for example, a tandem type of color image forming apparatus, in which toner images of four colors of yellow (Y), magenta (M), cyan (C), and black (K) are superimposed. The image forming apparatus 10 includes the operation display 11, an auto document feeder (ADF) 12, a paper feeder 13, an image former 14, an intermediate transfer belt 15 (image carrier), a secondary transfer unit 17, a fixing unit 18, and a paper discharge tray 19.

The operation display 11 has a function as an operation unit that gives an instruction to start a job such as image formation processing. The operation display 11 is composed of, for example, a liquid crystal display (LCD) on which touch operation is possible, and displays, for example, various setting screens and dialogs. A setting item that can be changed in accordance with the function of the image forming apparatus 10 is displayed on the setting screen. A printer driver instructs the image forming apparatus 10 to perform printing. A user can input an operation and confirm displayed information on the operation display 11. The operation display 11 serves as both an operation unit and a display. Note that the operation unit can be configured by, for example, a mouse and a tablet, and configured separately from the display.

The automatic document feeder 12 automatically feeds a document when the document is read. A scanner (not illustrated) provided in the automatic document feeder 12 can read images of a document placed on a top platen glass of the image forming apparatus 10 or a document automatically transported by the automatic document feeder 12.

The paper feeder 13 includes a plurality of paper feed trays 13*a* (examples of paper housing part) capable of housing paper having different paper sizes and paper types. When the corresponding paper feed tray 13*a* is selected based on an instruction from the image forming apparatus 10, paper is drawn from the paper feed tray 13*a*, and sent to the transport path 20 in the paper feeder 13. The transport path 20 branches on the downstream side of the fixing unit 18. An inverted transport path 21 that joins the transport path 20 on the upstream side is connected to one end of the branched transport path 20. An inversion unit 22 that inverts paper is provided in the inverted transport path 21. The paper inverted by the inversion unit 22 is returned to the upstream side of the transport path 20 through the inverted transport path 21. Paper inverted by path switching may be returned to the transport path 20 on the downstream side of the fixing unit 18, and then discharged to the paper discharge tray 19.

The image former 14 forms an image on paper. The image former 14 includes four image forming units 16Y, 16M, 16C, and 16K. The image former 14 controls the operations of the image forming units 16Y, 16M, 16C, and 16K of the image former 14, and forms toner images of Y, M, C, and K. The image forming apparatus 10 includes a plurality of rollers (transport rollers) for transporting paper to the transport path 20. These rollers are usually composed of a pair of rollers.

In an image formation mode, the image forming apparatus 10 charges photoconductors of the image forming units 16Y, 16M, 16C, and 16K, exposes the photoconductors to eliminate electric charge, and forms electrostatic latent images on the photoconductor. The image forming apparatus 10 attaches toner to the electrostatic latent images of yellow, magenta, cyan, and black on the photoconductor with a developing unit, and forms a toner image of each color. The image forming apparatus 10 primarily transfers the toner images formed on the photoconductors of yellow, magenta, cyan, and black sequentially on the surface of the intermediate transfer belt 15 that rotates in an arrow direction.

The secondary transfer unit 17 includes a secondary transfer roller. The secondary transfer unit 17 secondarily transfers the toner images of each color primarily transferred on the intermediate transfer belt 15 to paper supplied from the paper feeder 13 and transported through the transport path 20. A color image is formed by the secondarily transferring the toner images of each color on the intermediate transfer belt 15 to the paper. The image forming apparatus 10 transports the paper on which the color toner image is formed to the fixing unit 18.

The fixing unit 18 is an apparatus that performs fixing processing on paper on which a color toner image is formed. The fixing unit 18 pressurizes and heats the transported paper to fix the transferred toner image on the paper. The fixing unit 18 includes, for example, a fixing upper roller and a fixing lower roller, which are fixing members. The fixing upper roller and the fixing lower roller are disposed in a state of being in pressure contact with each other. A fixing nip portion is formed as a pressure contact portion between the fixing upper roller and the fixing lower roller.

A heater (not illustrated) is provided inside the fixing upper roller. Radiant heat from the heater warms a roller portion on the outer periphery of the fixing upper roller. The paper is transported to the fixing nip portion such that the surface on which the toner image is transferred by the secondary transfer unit 17 (surface to be fixed) faces the fixing upper roller. The paper passing through the fixing nip portion is pressurized by the fixing upper roller and the fixing lower roller, and heated by the heat of the roller portion of the fixing upper roller. The paper subjected to the fixing processing by the fixing unit 18 is discharged to the paper discharge tray 19.

<Hardware Configuration of Image Forming System>

The hardware configuration of the image forming system 1 will now be described.

Figure 3:
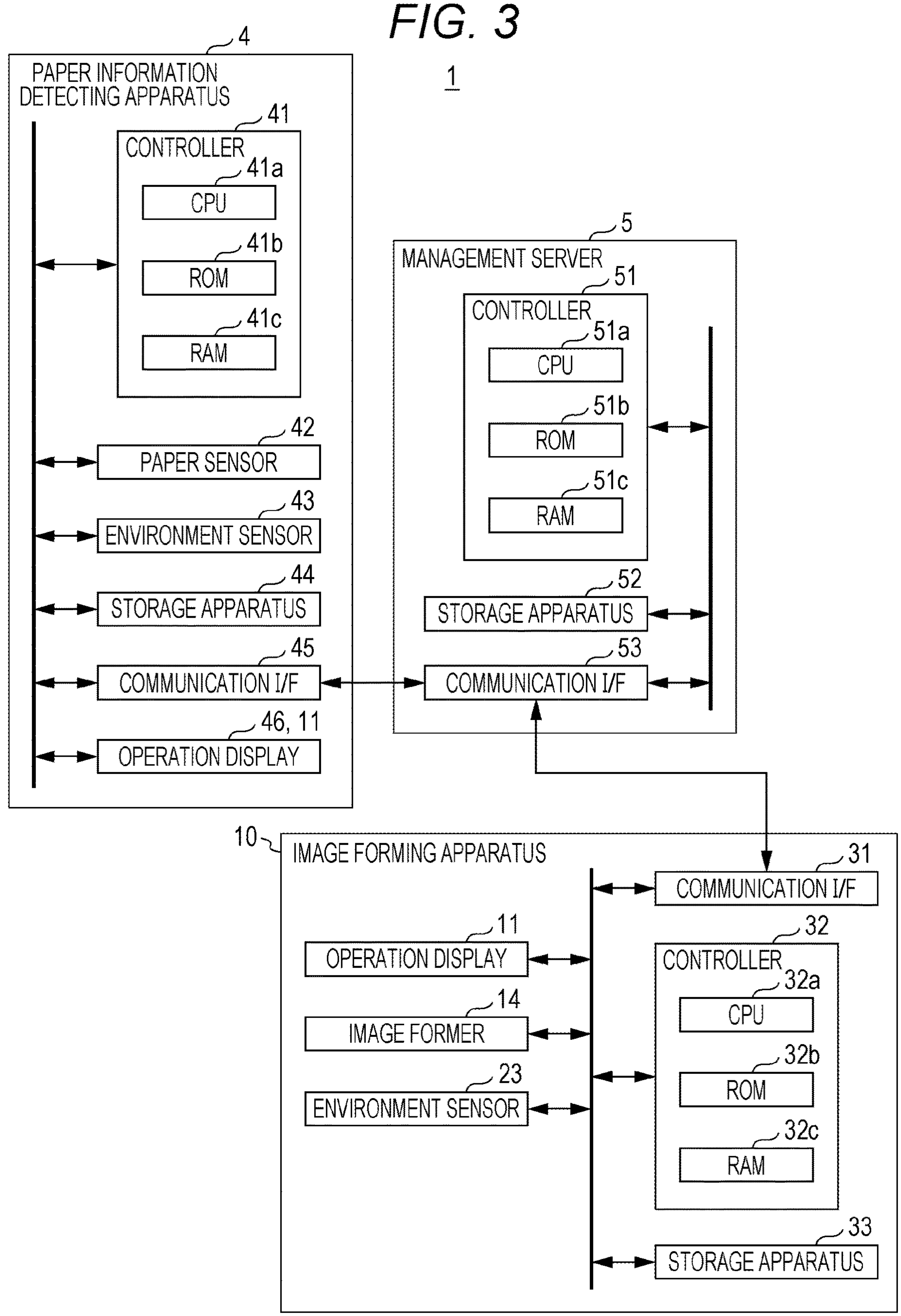
FIG. 3 is a hardware configuration diagram illustrating an example of the configuration of a main part of the image forming system according to the first embodiment of the invention.

FIG. 3 is a hardware configuration diagram illustrating an example of the configuration of a main part of the image forming system 1.

(Hardware Configuration of Paper Information Detecting Apparatus)

The paper information detecting apparatus 4 in FIG. 3 is an extraction of the main parts common to the media detecting apparatus 3 and the image forming apparatus 10A. The paper information detecting apparatus 4 includes a controller 41, the paper sensor 42, an environment sensor 43, a storage apparatus 44, a communication I/F 45, and an operation display 46.

The controller 41 includes a central processing unit (CPU) 41*a*, a read only memory (ROM) 41*b*, and a random access memory (RAM) 41*c*. These components are connected via a bus.

The controller 41 is used as one example of a computer that controls the entire operation of the paper information detecting apparatus 4. For example, when paper is set at a detection position of the paper sensor 42, the CPU 41*a* gives an instruction to cause the paper sensor 42 to detect paper characteristic information and to cause the environment sensor 43 to detect environmental information. The CPU 41*a* expands and executes various programs, an operating system (OS), and application software read from the storage apparatus 44 or the ROM 41*b* on the RAM 41*c* as needed. The CPU 41*a* transmits various pieces of information such as paper characteristic information detected by the paper sensor 42 and environmental information detected by the environment sensor 43 to the management server 5 through the communication interface (I/F) 45.

The paper sensor 42 detects the paper characteristic information on paper set at a predetermined detection position. For example, the paper characteristic information is detected by a user setting paper at a detection position of the paper sensor 42 in the media detecting apparatus 3. The paper characteristic information is detected by paper being automatically transported to the detection position of the paper sensor 42 in the image forming apparatus 10A. For example, the paper sensor 42 can detect paper quality by detecting change in a received light amount in the combination of a light emitting element and a light receiving element. The paper sensor 42 can also detect the rigidity of paper. The paper characteristic information detected by the paper sensor 42 is temporarily stored in the RAM 41*c*.

The environment sensor 43 detects environmental information at the installation position of the paper information detecting apparatus 4. The environment sensor 43 detects the temperature or humidity of the paper information detecting apparatus 4. Here, if the environment sensor 43 is installed outside the paper information detecting apparatus 4, the environment sensor 43 detects the temperature or humidity outside the paper information detecting apparatus 4. In contrast, if the environment sensor 43 is installed inside the paper information detecting apparatus 4, the environment sensor 43 detects the temperature or humidity inside the paper information detecting apparatus 4. The environmental information detected by the environment sensor 43 is temporarily stored in the RAM 41*c*.

The communication I/F 45 includes a network interface card (NIC) and a modem. The communication I/F 45 establishes a connection with a device connected via the network N, and transmits and receives data. Specifically, the communication I/F 45 transmits the paper information and the environmental information to the management server 5. The communication I/F 45 receives a message confirming receipt of various pieces of information from the management server 5.

Here, the paper information detecting apparatus 4 transmits paper characteristic information to the management server 5 (later-described information manager 511 in FIG. 4) via the communication I/F 45 at the timing either when a paper characteristic information detector 412 detects the paper characteristic information, when the information manager 511 receives a request for acquiring the paper characteristic information from the image forming apparatus 10, or when the environment in which the paper information detecting apparatus 4 is installed is changed.

The storage apparatus 44 includes a non-volatile storage apparatus such as a flash memory. The storage apparatus 44 stores data such as a program for the CPU 41*a* to control each unit, a printer driver, various programs, and application software. Some of data stored in the storage apparatus 44 is stored in the ROM 41*b*. In this way, the storage apparatus 44 records, for example, programs and data necessary for the CPU 41*a* to operate. The storage apparatus 44 is used as one example of a computer-readable non-transient recording medium that stores a program executed by the management server 5. Note that the computer-readable non-transient recording medium storing a program executed by the paper information detecting apparatus 4 is not limited to the storage apparatus 44, and may be, for example, the ROM 41*b*.

The operation display 46 is provided in the media detecting apparatus 3, displays the paper characteristic information detected by the paper sensor 42, and prompts the user to input the paper type information. The paper type information input by the user through the operation display 46 is stored in the RAM 41*c* of the media detecting apparatus 3. Note that the image forming apparatus 10A is provided with the operation display 11 (see FIG. 1) instead of the operation display 46. The paper type information input by the user through the operation display 11 is stored in the RAM 41*c* of the image forming apparatus 10A. Note, however, that the operation display 46 is not provided in the media detecting apparatus 3. When the paper sensor 42 detects paper characteristic information, the controller 41 may automatically associate the paper type information with the paper characteristic information.

(Hardware Configuration of Management Server)

The management server 5 includes a controller 51, a storage apparatus 52, and a communication I/F 53. The controller 51 includes a CPU 51*a*, a ROM 51*b*, and a RAM 51*c*, which are connected via a bus.

The controller 51 is used as one example of a computer that controls the entire operation of the management server 5. For example, the CPU 51*a* manages various pieces of information received from the paper information detecting apparatus 4 in association with each other. The CPU 51*a* expands and executes various programs, an OS, and application software read from the storage apparatus 52 or the ROM 51*b* on the RAM 51*c* as needed.

The storage apparatus 52 includes a hard disk drive (HDD). The storage apparatus 52 stores data such as a program for the CPU 51*a* to control each unit, a printer driver, various programs, and application software. A part of data stored in the storage apparatus 52 is stored also in the ROM 51*b*. In this way, the storage apparatus 52 records, for example, programs and data necessary for the CPU 51*a* to operate. The storage apparatus 52 is used as one example of a computer-readable non-transient recording medium storing a program executed by the management server 5. Note that the computer-readable non-transient recording medium storing a program executed by the management server 5 is not limited to the storage apparatus 52, and may be a recording medium such as the ROM 51*b*, a solid state drive (SSD), a CD-ROM, and a DVD-ROM.

The communication I/F 53 includes an NIC and a modem. The communication I/F 53 establishes a connection with a device connected via the network N, and transmits and receives data. Specifically, the communication I/F 53 receives paper information and environmental information from the paper information detecting apparatus 4, and transmits paper information corresponding to the environmental information received from the image forming apparatus 10 to the image forming apparatus 10.

(Hardware Configuration of Image Forming Apparatus)

The image forming apparatus 10 includes a communication I/F 31, a controller 32, and a storage apparatus 33 in addition to the above-described operation display 11, the image former 14, and an environment sensor 23.

The controller 32 includes a CPU 32*a*, a ROM 32*b*, and a RAM 32*c*, which are connected via a bus.

The communication I/F 31 performs processing of transmitting environmental information to the management server 5 via the network N and receiving paper information from the management server 5 via the network N. The communication I/F 31 receives a job from a printer controller or a PC (not illustrated).

The controller 32 is used as one example of a computer that controls the entire operation of the image forming apparatus 10. For example, the CPU 32*a* can control image formation processing (printing operation) performed by the image forming apparatus 10 based on a setting change or a printing instruction from a user given through the operation display 11. The CPU 32*a* expands and executes various programs and an OS read from the storage apparatus 33 or the ROM 32*b* on the RAM 32*c* as needed, analyzes the job received from the management server 5 through the communication I/F 31, and controls the operation of the image former 14.

The storage apparatus 33 includes an HDD. The storage apparatus 33 stores data such as a program for the CPU 32*a* to control each unit, a printer driver, various programs, and application software. A part of data stored in the storage apparatus 33 is stored in the ROM 32*b*. In this way, the storage apparatus 33 records, for example, programs and data necessary for the CPU 32*a* to operate. The storage apparatus 33 is used as one example of a computer-readable non-transient recording medium storing a program executed by the image forming apparatus 10. Note that the computer-readable non-transient recording medium storing a program executed by the image forming apparatus 10 is not limited to the storage apparatus 33, and may be a recording medium such as an SSD, a CD-ROM, and a DVD-ROM.

<Example of Functional Configuration of Image Forming System>

An example of the functional configuration of the image forming system 1 will now be described.

Figure 4:
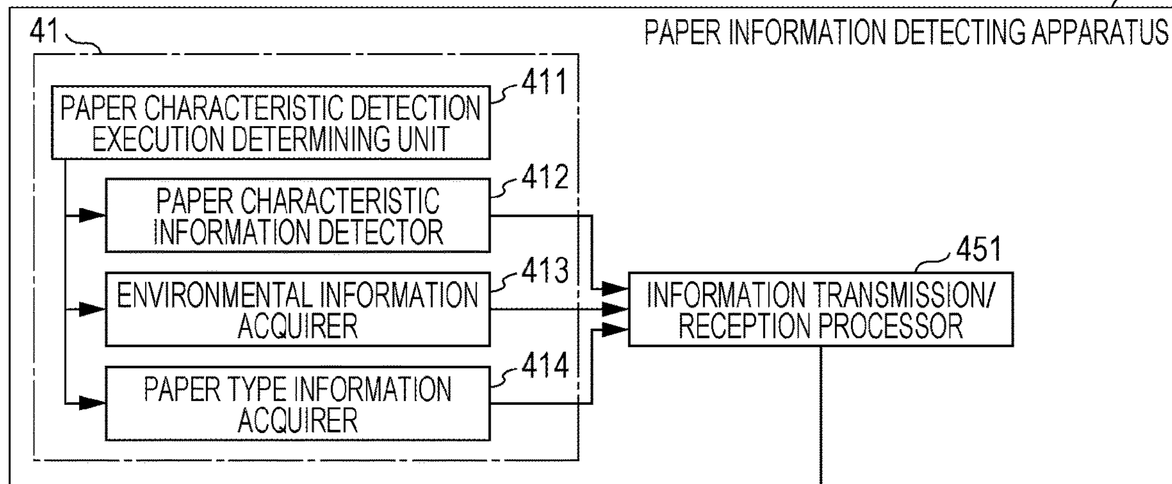
FIG. 4 is a functional block diagram illustrating an example of the configurations of main functions extracted from the image forming system according to the first embodiment of the invention.
Figure 4:
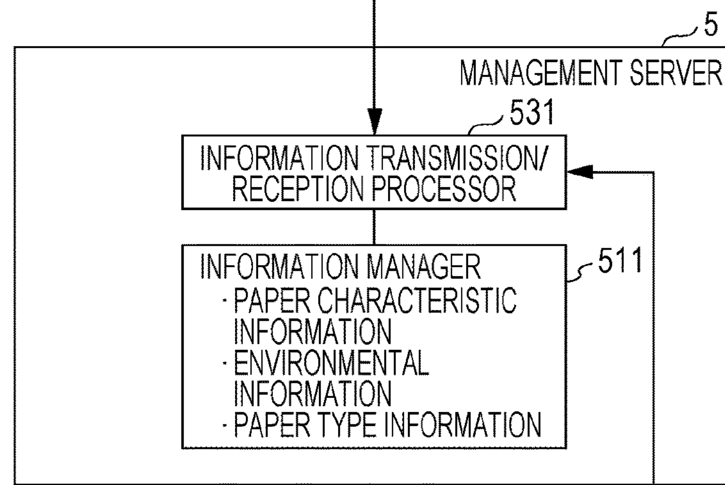
Figure 4:
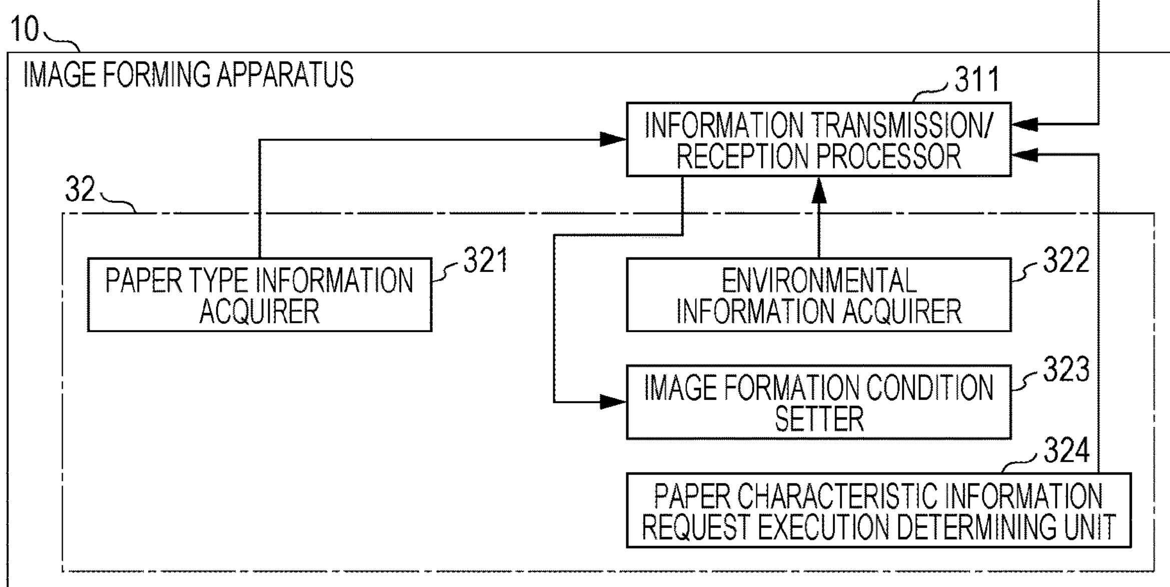

FIG. 4 is a functional block diagram illustrating an example of the configurations of main functions extracted from the image forming system 1.

The paper information detecting apparatus 4 includes a paper characteristic detection execution determining unit 411, the paper characteristic information detector 412, an environmental information acquirer 413, a paper type information acquirer 414, and an information transmission/reception processor 451. The paper characteristic detection execution determining unit 411, the paper characteristic information detector 412, the environmental information acquirer 413, and the paper type information acquirer 414 are functions implemented by the controller 41 of the paper information detecting apparatus 4 in FIG. 3. The information transmission/reception processor 451 is a function implemented by the communication I/F 45 in FIG. 3.

The paper characteristic detection execution determining unit 411 determines whether or not it is necessary to perform paper characteristic detection processing. For example, when paper is set at the detection position of the paper sensor 42, the paper characteristic detection execution determining unit 411 determines that it is necessary to perform the paper characteristic detection processing. When determining that it is necessary to perform the detection processing, the paper characteristic detection execution determining unit 411 activates the paper characteristic information detector 412, the environmental information acquirer 413, and the paper type information acquirer 414.

The paper characteristic information detector 412 (one example of recording material characteristic information detector) detects paper characteristic information representing the characteristics of paper from the paper, which is one example of the first recording material. The paper characteristic information detector 412 detects the paper characteristic information by acquiring the physical property value of the paper detected by the paper sensor 42 in FIG. 3. The paper characteristic information includes one or more pieces of physical property value information detected by the paper characteristic information detector 412. The physical property value information includes at least one of a water content, a resistance value, and rigidity.

Here, when provided outside another image forming apparatus 10A, the paper characteristic information detector 412 acquires the paper characteristic information of the paper (first recording material) used in the other image forming apparatus 10A. In contrast, when provided inside the other image forming apparatus 10A, the paper characteristic information detector 412 acquires the paper characteristic information of the paper (first recording material) transported in the other image forming apparatus 10A.

The environmental information acquirer 413 (one example of first environmental information acquirer) acquires environmental information representing the environment in which the paper information detecting apparatus 4 is installed (one example of first environmental information). The environmental information is acquired from the environment sensor 43 at the time when the paper information detecting apparatus 4 performs paper information detection processing. The environmental information includes at least one of the temperature and humidity of the environment around the paper information detecting apparatus 4.

The paper type information acquirer 414 (one example of first recording material type information acquirer) acquires the paper type information (one example of first recording material type information) on paper, which is one example of the first recording material. For example, the paper type information acquirer 414 acquires the paper type information input from the operation display 46 provided in the paper information detecting apparatus 4. The paper type information includes information on, for example, a paper manufacturer, a paper product number, and a product name in addition to information on whether or not the paper type is either a plain paper or a coated paper.

The paper type information acquirer 414 can estimate candidates of the paper type information based on the physical property value of the paper acquired by the paper characteristic information detector 412. If the paper information detecting apparatus 4 is provided with the operation display 46 including an operation unit and a display unit, the paper type information acquirer 414 displays the candidates of paper type information on the display, and the user operates the operation unit to select one piece of paper type information from the candidates of the paper type information, whereby the paper type information acquirer 414 can acquire the paper type information. Alternatively, the paper type information acquirer 414 may acquire a name determined by the user and input from the operation unit as the paper type information.

The controller 41 outputs the paper information in which the paper characteristic information, the environmental information, and the paper type information are associated to the information transmission/reception processor 451.

The information transmission/reception processor 451 transmits the paper information to the management server 5.

The management server 5 includes an information transmission/reception processor 531 and the information manager 511. The information transmission/reception processor 531 is a function implemented by the communication I/F 53 of the management server 5 in FIG. 3. The information manager 511 is a function implemented by the controller 51 and the storage apparatus 52 in FIG. 3.

The information transmission/reception processor 531 receives the paper information containing the paper characteristic information, the environmental information, and the paper type information from the paper information detecting apparatus 4. When receiving a request for acquiring the paper characteristic information from the image forming apparatus 10, the information transmission/reception processor 531 outputs the acquisition request to the information manager 511. The information transmission/reception processor 531 transmits the paper characteristic information to the image forming apparatus 10 depending on an instruction of the information manager 511.

The information manager 511 associates and manages the paper characteristic information and the first environmental information received from the paper information detecting apparatus 4. The information manager 511 selects matching data from the information stored and managed by the information manager 511 itself in response to a paper characteristic information request received by the information transmission/reception processor 531 from the image forming apparatus 10. Here, the information manager 511 selects the paper characteristic information, which is the first environmental information closest to the second environmental information and is associated with the first environmental information.

At this time, the information manager 511 selects the first environmental information closest to the second environmental information from a plurality of pieces of first environmental information by using at least one condition of the granularity and weighting of the first environmental information and the second environmental information. The granularity represents the range of a value of detectable temperature or humidity, and is determined as 2° C. for temperature and 5% for humidity, for example. The weighting is a value representing which of temperature and humidity is emphasized. The weighting is set for the first environmental information and the second environmental information. The information manager 511 determines whether to select the first environmental information containing temperature closer to the temperature of the second environmental information or whether to select the first environmental information containing humidity closer to the humidity of the second environmental information.

When receiving the second environmental information together with a request for acquiring the paper characteristic information from the image forming apparatus 10, the information manager 511 transmits the paper characteristic information to the image forming apparatus 10. The paper characteristic information is the first environmental information corresponding to the second environmental information, and associated with the first environmental information. Here, the first environmental information that is the same as or closest to the second environmental information is referred to as the "first environmental information corresponding to second environmental information". The processing of transmitting the paper characteristic information to the image forming apparatus 10 is performed by the information manager 511 outputting an instruction to transmit the paper characteristic information to the image forming apparatus 10 via the information transmission/reception processor 531.

Here, the information manager 511 can also associate and manage the first recording material type information in addition to the first environmental information and the paper characteristic information received from the paper information detecting apparatus 4. When receiving the second environmental information and second recording material type information together with a request for acquiring the paper characteristic information from the image forming apparatus 10, the information manager 511 transmits first recording material type information that matches the second recording material type information and the paper characteristic information associated with the first environmental information corresponding to the second environmental information to the image forming apparatus 10.

Note that, when there is a difference between the first environmental information and the second environmental information, the information manager 511 may correct the second environmental information in accordance with the first environmental information, and may transmit the paper characteristic information to the image forming apparatus 10. The paper characteristic information is the first environmental information corresponding to the corrected second environmental information, and associated with the first environmental information.

When not managing the paper characteristic information, the information manager 511 can notify the image forming apparatus 10 that the paper characteristic information cannot be acquired. The paper characteristic information is the first environmental information corresponding to the second environmental information received from the image forming apparatus 10, and associated with the first environmental information.

The image forming apparatus 10 includes an information transmission/reception processor 311, a paper type information acquirer 321, an environmental information acquirer 322, an image formation condition setter 323, and a paper characteristic information request execution determining unit 324. The information transmission/reception processor 311 is a function implemented by the communication IF 31 of the image forming apparatus 10 in FIG. 3. The paper type information acquirer 321, the environmental information acquirer 322, the image formation condition setter 323, and the paper characteristic information request execution determining unit 324 are functions implemented by the controller 32 in FIG. 3.

The information transmission/reception processor 311 transmits the paper type information, the second environmental information, and a request for acquiring the paper characteristic information to the management server 5. The information transmission/reception processor 311 receives the paper characteristic information from the management server 5.

The controller 32 associates and outputs the paper type information, the environmental information, and a paper characteristic information request to the information transmission/reception processor 311. The paper type information is acquired by the paper type information acquirer 321. The environmental information is acquired by the environmental information acquirer 322. The paper characteristic information request execution determining unit 324 determines execution of an acquisition request for the paper characteristic information request. The information transmission/reception processor 311 transmits these pieces of information to the management server 5.

The paper type information acquirer 321 (one example of second recording material type information acquirer) acquires the paper type information (one example of second recording material type information) on paper, which is one example of the second recording material. The paper type information acquirer 321 acquires the paper type information input from the operation display 11 (see FIG. 1) of the image forming apparatus 10. For example, the paper type information acquirer 321 displays the candidates of paper type information on the operation display 11, and the user operates the operation display 11 to select one piece of paper type information from the candidates of the paper type information, whereby the paper type information acquirer 321 can acquire the paper type information. Alternatively, the paper type information acquirer 414 may acquire a name determined by the user and input from the operation display 11 as the paper type information.

The environmental information acquirer 322 (one example of second environmental information acquirer) acquires environmental information (one example of second environmental information) representing the environment in which the image forming apparatus 10 is installed. The environmental information is acquired from the environment sensor 23 at the time when the image forming apparatus 10 forms an image on paper, and includes at least one of temperature and humidity.

The paper characteristic information request execution determining unit 324 (one example of recording material characteristic information requester) determines whether or not to execute a request for acquiring the paper characteristic information. When determining that the paper characteristic information request is necessary, the paper characteristic information request execution determining unit 324 transmits the second environmental information to the management server 5, and requests the paper characteristic information corresponding to the second environmental information.

The paper characteristic information request execution determining unit 324 outputs an instruction to request the paper characteristic information to the information transmission/reception processor 311. At this time, the paper characteristic information request execution determining unit 324 can cause the information transmission/reception processor 311 to transmit the second environmental information and a paper type together with a request for acquiring the paper characteristic information to the management server 5. Here, the paper characteristic information request execution determining unit 324 transmits a request for acquiring the paper characteristic information at the timing when paper is housed in a recording material housing part and the paper type information is acquired or when the image former 14 starts processing of forming an image on paper.

The image formation condition setter 323 sets an image formation condition for the image former 14 to form an image on the paper based on the paper characteristic information acquired from the management server 5 via the information transmission/reception processor 311. The image formation condition includes, for example, a fixing temperature (water content), a transfer condition (resistance value), a decal amount (rigidity), and an image creation condition. For example, when the installation environment of the image forming apparatus 10 has a high humidity, the settings of the image formation condition are changed. In the setting change, the controller 32 increases a fixing temperature, or raises secondary transfer current. An image formation condition set by the image formation condition setter 323 is stored in the RAM 32*c* of the image forming apparatus 2. The controller 32 executes image formation processing by causing, for example, the paper feeder 13 and the image former 14 to perform various pieces of processing related to image formation based on the image formation condition read from the RAM 32*c*. The image formation condition is stored in the storage apparatus 33. The controller 32 may read the image formation condition from the storage apparatus 33.

When there is a difference between the first environmental information managed by the information manager 511 and the second environmental information acquired by the environmental information acquirer 322, the image formation condition setter 323 corrects and sets the image formation condition. The image formation condition setter 323 can also receive a comparison result together with the paper characteristic information from the information manager 511. The comparison result indicates that there is a difference between the first environmental information and the second environmental information.

When notified by the information manager 511 that the paper characteristic information cannot be acquired, the image formation condition setter 323 sets a default image formation condition held by the image formation condition setter 323 itself.

The image forming system 1 according to the first embodiment in which the management server 5 is interposed between the paper information detecting apparatus 4 and the image forming apparatus 10 has been described so far. An example of the configuration of an image forming system 1A according to a second embodiment will now be described. In the image forming system 1A, a paper information detecting apparatus stores and manages the paper information such as paper characteristic information without interposing the management server 5.

Second Embodiment

Figure 5:
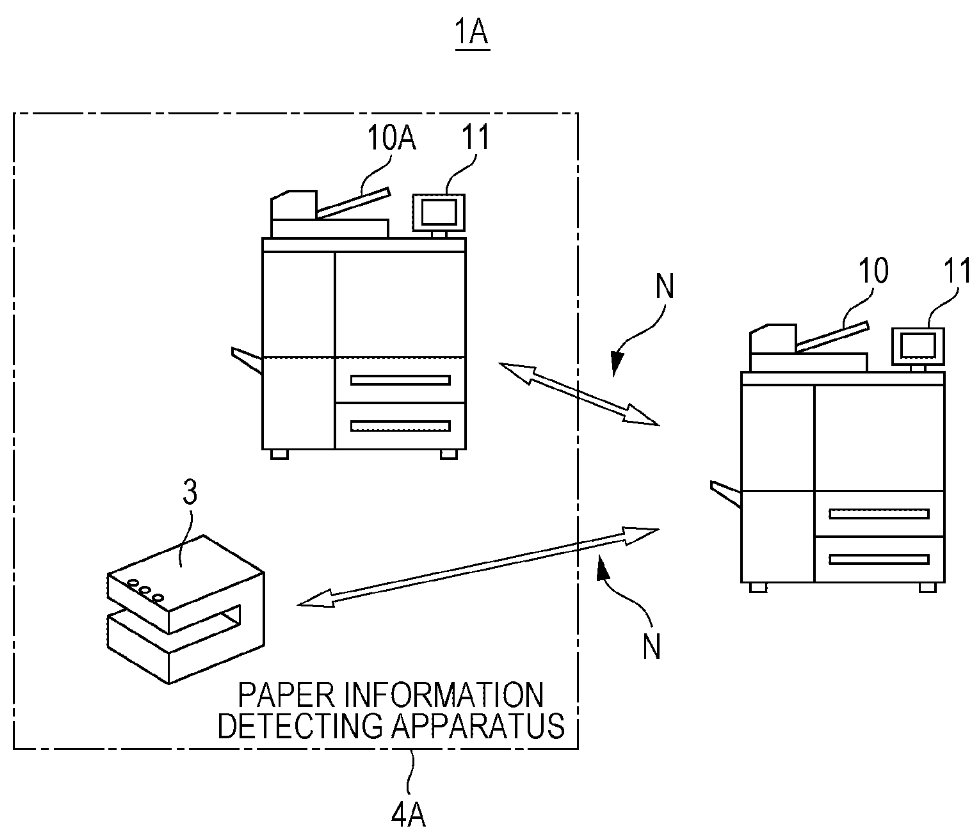
FIG. 5 is a schematic diagram illustrating an example of the entire configuration of an image forming system according to a second embodiment of the invention.

FIG. 5 is a schematic diagram illustrating an example of the entire configuration of the image forming system 1A according to a second embodiment.

As described above, the image forming system 1A according to the second embodiment includes a paper information detecting apparatus 4A and the image forming apparatus 10. The paper information detecting apparatus 4A and the image forming apparatus 10 can communicate with each other via the network N. The paper information detecting apparatus 4A manages paper information as illustrated in FIG. 6 described later.

<Example of Functional Configuration of Image Forming System>

An example of the functional configuration of the image forming system 1A will now be described.

Figure 6:
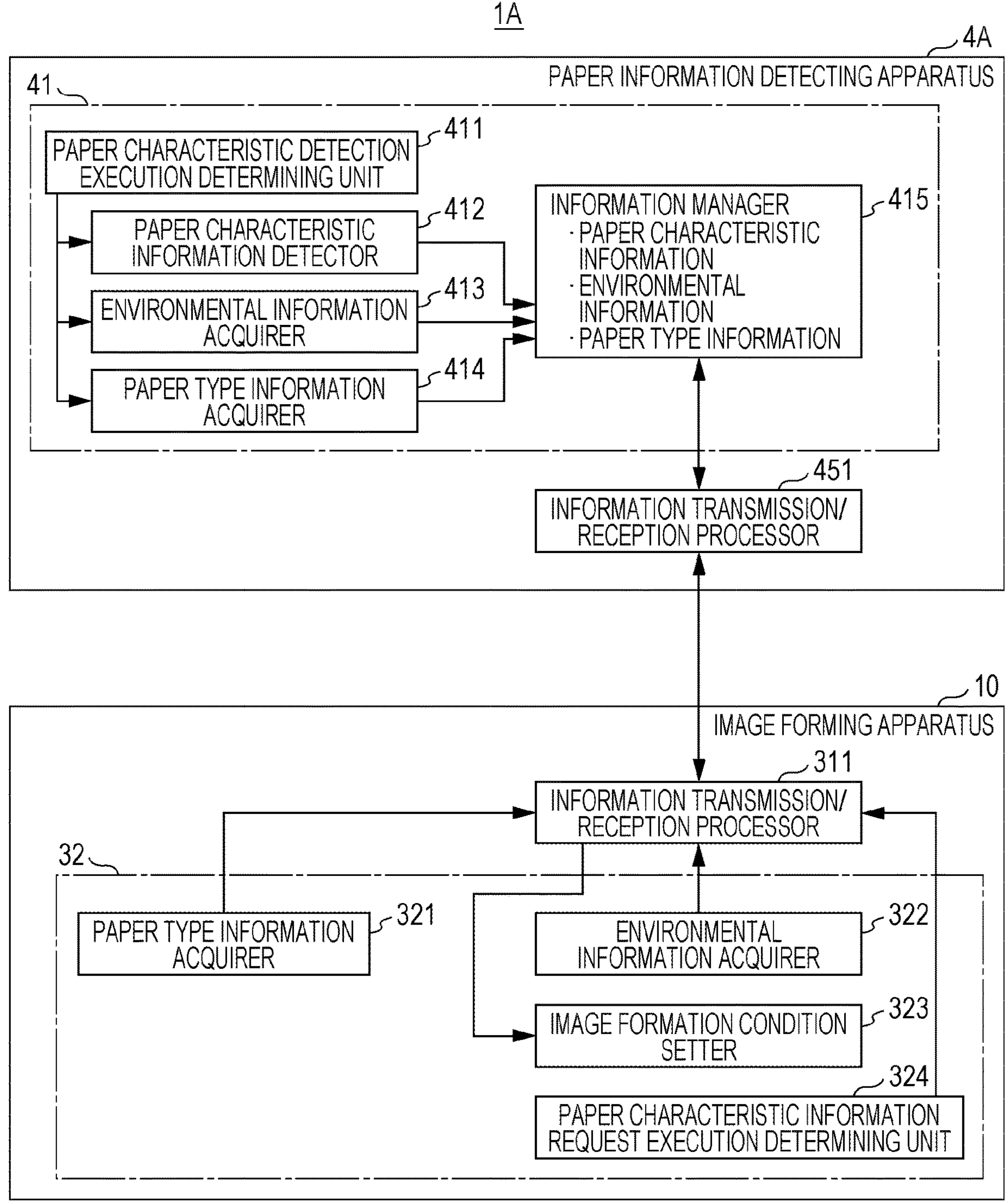
FIG. 6 is a block diagram illustrating an example of the configurations of main functions extracted from the image forming system according to the second embodiment of the invention.

FIG. 6 is a functional block diagram illustrating an example of the configurations of main functions extracted from the image forming system 1A.

The paper information detecting apparatus 4A includes an information manager 415 in addition to each functional unit of the paper information detecting apparatus 4 according to the first embodiment in FIG. 4. For example, the information manager 415 is a function implemented by the controller 41 in FIG. 3. The information manager 415 stores and manages paper characteristic information, environmental information, and paper type information. That is, the information manager 415 has a function similar to that of the information manager 511 of the management server 5 in FIG. 4, and thus detailed description thereof will be omitted.

The information transmission/reception processor 451 of the paper information detecting apparatus 4A performs processing of receiving a request for acquiring paper characteristic information from the image forming apparatus 10, paper type information, and environmental information.

The information manager 415 associates and manages the paper characteristic information and the first environmental information. The information manager 415 selects matching data from the information stored and managed by the information manager 415 itself in response to a paper characteristic information request received by the information transmission/reception processor 451 from the image forming apparatus 10. When receiving the second environmental information together with a request for acquiring the paper characteristic information from the image forming apparatus 10, the information manager 415 transmits the paper characteristic information to the image forming apparatus 10. The paper characteristic information is the first environmental information corresponding to the second environmental information, and associated with the first environmental information. The processing of transmitting the paper characteristic information to the image forming apparatus 10 is performed by the information manager 415 outputting an instruction to transmit the paper characteristic information to the image forming apparatus 10 via the information transmission/reception processor 451.

The information manager 415 can also associate and manage the first recording material type information in addition to the first environmental information and the paper characteristic information. When receiving the second environmental information and a paper type together with a request for acquiring the paper characteristic information from the image forming apparatus 10, the information manager 415 transmits paper characteristic information in associated with the first recording material type information that matches the paper type information and the first environmental information corresponding to the second environmental information to the image forming apparatus 10.

Next, an example of processing performed in each functional unit of the image forming systems according to the first and second embodiments of the invention will now be described with reference to FIGS. 7 to 9.

<Processing of Updating and Transmitting Paper Information>

First, processing performed in the paper information detecting apparatus 4 or the paper information detecting apparatus 4A (hereinafter, collectively referred to as "paper information detecting apparatus") will be described.

Figure 7:
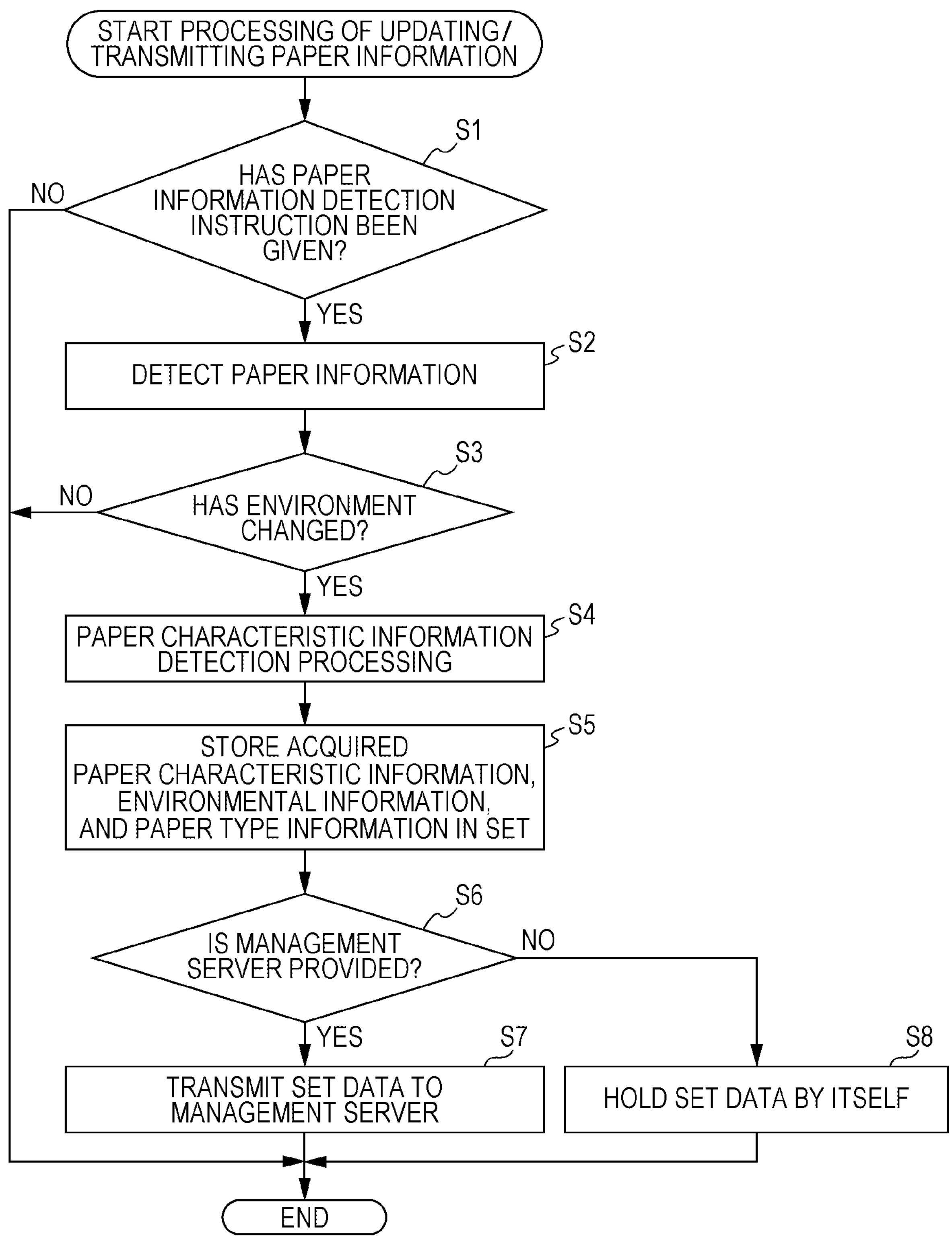
FIG. 7 is a flowchart illustrating an example of processing of updating and transmitting paper information according to the first and second embodiments of the invention.

FIG. 7 is a flowchart illustrating an example of processing of updating and transmitting paper information.

First, the controller 41 of the paper information detecting apparatus determines whether or not a user has given an instruction for paper information detection processing (S1). When determining that the instruction for paper information detection processing has not been given (NO in S1), the controller 41 ends the processing.

In contrast, when determining that the instruction for paper information detection processing has been given (YES in S1), the controller 41 starts paper information detection processing for paper set on the paper information detecting apparatus, and detects paper information (S2).

Next, when the environmental information acquirer 413 acquires the environmental information detected by the environment sensor 43, the controller 41 determines whether or not an environment has changed based on the environmental information (S3). For example, when the environment sensor 43 detects an environmental change such as the case where an environment, in which paper should be installed at a humidity of 30%, is left unattended and thereby the humidity changes to 35%, the controller 41 determines to acquire paper information again.

When determining that the environment has not changed (NO in S3), the controller 41 ends the processing. In contrast, when determining that the environment has changed (YES in S3), the controller 41 executes paper characteristic information detection processing (S4). In the paper characteristic information detection processing, processing of detecting paper characteristic information on paper is performed based on a physical property value detected by the paper sensor 42. The paper characteristic information detector 412 acquires the physical property value from the paper sensor 42.

The controller 41 stores set data of paper information in the RAM 41*c* (S5). Paper characteristic information, environmental information, and paper type information are associated in the paper information. The environmental information acquirer 413 has acquired the environmental information from the environment sensor 43. The paper type information has been input by the operation display 11 or 46. The set data has a configuration in which each piece of different environmental information has a plurality of pieces of paper characteristic information for one piece of paper type information. The controller 41 selects a transmission destination of the set data of the paper information.

The controller 41 determines whether or not the management server 5 is provided as the transmission destination of the set data (S6). In the image forming system 1 according to the first embodiment, the management server 5 is provided as the transmission destination of the set data (YES in S6). The controller 41 transmits the set data to the management server 5 through the information transmission/reception processor 451 (S7), and ends the processing.

In contrast, the management server 5 is not provided in the image forming system 1A according to the second embodiment (NO in S6). The paper information detecting apparatus 4A holds the set data by itself (information manager 415) (S8), and ends the processing.

<Paper Characteristic Information Response Processing>

Processing performed by the information manager 415 or 511 will now be described.

Figure 8:
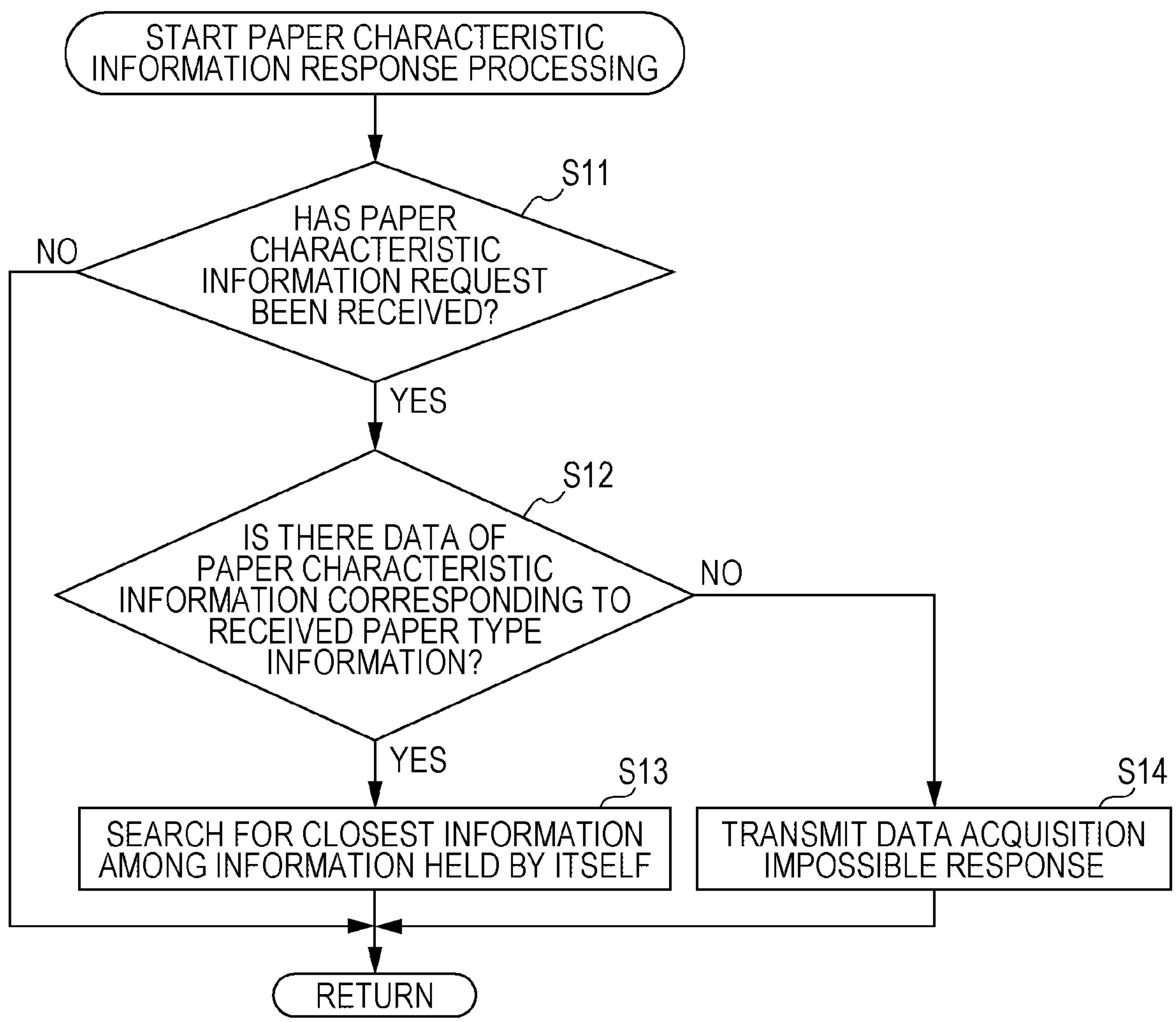
FIG. 8 is a flowchart illustrating an example of paper characteristic information response processing according to the first and second embodiments of the invention.

FIG. 8 is a flowchart illustrating an example of paper characteristic information response processing. The processing is also performed in the paper information detecting apparatus 4 (offline media detecting apparatus 3 or image forming apparatus 10A including paper sensor 42 inside).

First, the information manager 511 of the management server 5 according to the first embodiment or the information manager 415 of the paper information detecting apparatus 4A according to the second embodiment determines whether or not a request for acquiring paper characteristic information has been received from the image forming apparatus 10 that does not have the paper sensor 42 inside (S11). When determining that the request for acquiring paper characteristic information has not been received from the image forming apparatus 10 (NO in S11), the information manager 511 or 415 ends the processing.

In contrast, when determining that the request for acquiring paper characteristic information has been received from the image forming apparatus 10 (YES in S11), the information manager 511 or 415 determines whether or not data of the paper characteristic information corresponding to the paper type information received from the image forming apparatus 10 together with the request for acquiring the paper characteristic information is managed (S12).

When determining that the data of the paper characteristic information corresponding to the paper type information and the environmental information received from the image forming apparatus 10 is managed (YES in S12), the information manager 511 or 415 searches for the paper characteristic information that matches the acquisition request of the image forming apparatus 10 from the paper characteristic information held by the information manager 511 or 415 itself (S13). For example, a plurality of pieces of environmental information and paper characteristic information is associated with one paper type information. The information manager 511 or 415 searches for the paper characteristic information associated with the paper type information and the environmental information including the received environmental information in addition to the paper type information received from the image forming apparatus 10. The information manager 511 or 415 can also search for the paper characteristic information associated with the environmental information only from the environmental information received from the image forming apparatus 10. The information manager 511 or 415 transmits the paper characteristic information that has been searched for to the image forming apparatus 10.

In Step S13, when the information manager 511 or 415 searches for the environmental information associated with the paper type information in response to the acquisition request received from the image forming apparatus 10, and when the paper type information includes a plurality of pieces of environmental information, a screen on which the priority of which piece of environmental information is prioritized can be selected or specified may be displayed on the operation display 11 of the image forming apparatus 10. For example, in the embodiment, temperature or humidity is acquired as environmental information, and thereby a two-choice screen that allows a user to select which of the temperature or humidity is acquired can be displayed on the operation display 11.

The priority selected or specified by the user through the operation display 11 is transmitted to the management server 5 or the paper information detecting apparatus 4A again. The information manager 511 or 415 can specify the environmental information in accordance with the priority. Alternatively, the information manager 511 or 415 may select or specify the granularity (e.g., 0.1° C. unit for temperature and 1% unit for humidity) of each piece of environmental information.

When it is determined in Step S12 that the data of paper characteristic information corresponding to the paper type information and the environmental information received from the image forming apparatus 10 is not managed (NO in S12), the information manager 511 or 415 transmits the response indicating that the data of the paper characteristic information cannot be acquired to the image forming apparatus 10 (S14).

<Processing of Acquiring Paper Characteristic Information and Setting Image Formation Condition>

Processing performed in the image forming apparatus 10 that does not have the paper sensor 42 will now be described.

Figure 9:
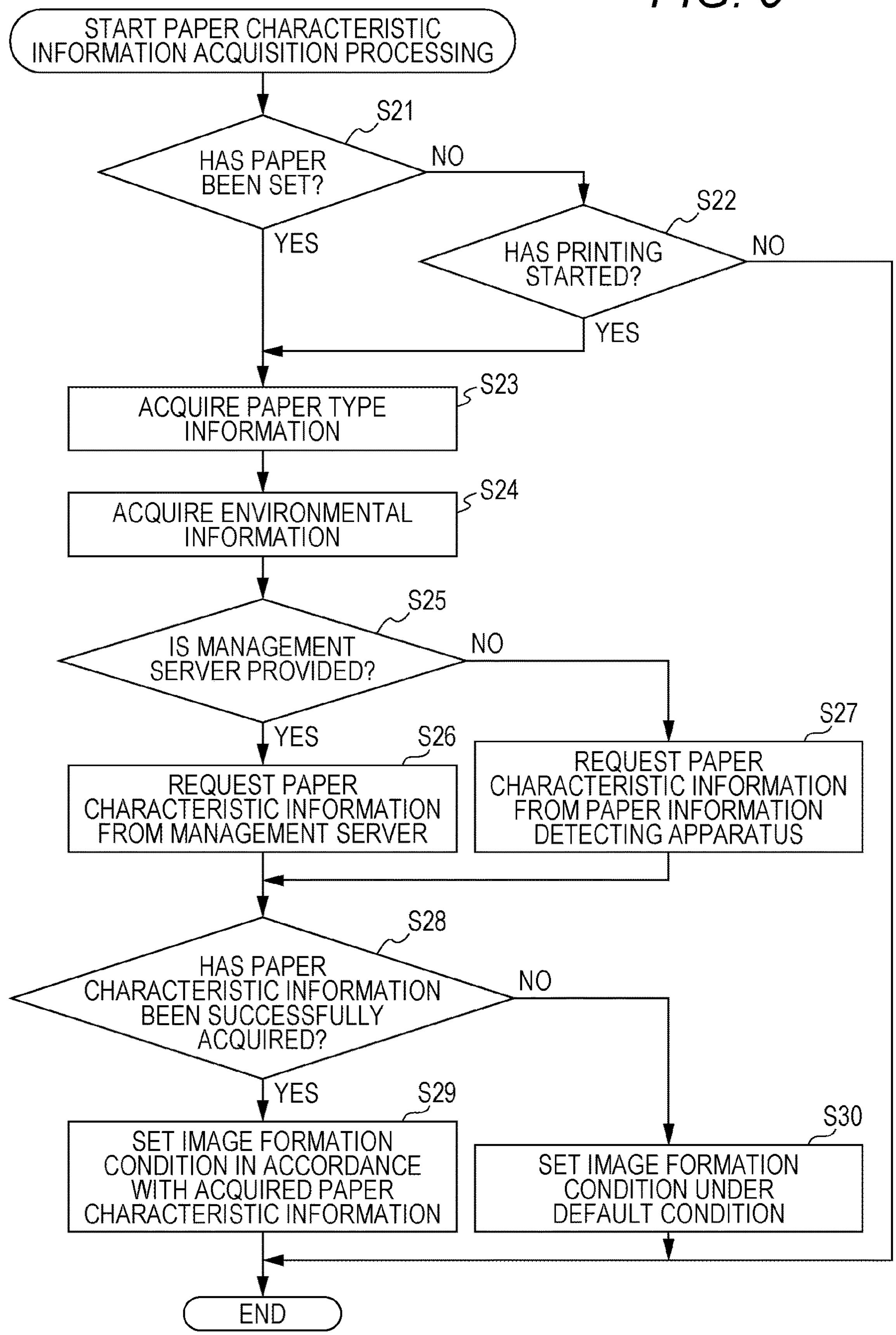
FIG. 9 is a flowchart illustrating an example of processing of acquiring paper characteristic information and processing of setting an image formation condition according to the first and second embodiments of the invention.

FIG. 9 is a flowchart illustrating an example of processing of acquiring paper characteristic information and processing of setting an image formation condition of the image forming apparatus 10.

The controller 32 of the image forming apparatus 10 in FIG. 3 determines whether or not paper has been newly set in the paper feed tray 13*a* (S21). When the controller 32 determines that paper has been newly set (YES in S21), a user inputs the paper type information through the operation display 11 as before. The paper type information acquirer 321 acquires paper type information input from the operation display 11 (S23).

Even when the controller 32 determines in step S21 that no paper has been newly set (NO in S21), paper might have been set in the paper feed tray 13*a* by the previous time. The controller 32 determines whether or not printing has started (S22). When determining that printing has not started (NO in S22), the controller 32 ends the processing.

In contrast, when the controller 32 determines that printing has started with paper having been set in the paper feed tray 13*a* by the previous time (YES in S22), the paper type information acquirer 321 acquires the paper type information (S23).

The environmental information acquirer 322 acquires environmental information from the environment sensor 23 (S24). The controller 32 determines whether or not the management server 5 is provided (S25).

The management server 5 is provided in the image forming system 1 according to the first embodiment. The controller 32 determines that the management server 5 is provided (YES in S25), and requests the management server 5 to acquire the paper characteristic information (S26). The processing is performed by transmitting a request for acquiring the paper characteristic information from the information transmission/reception processor 311 to the management server 5.

In contrast, the management server 5 is not provided in the image forming system 1A according to the second embodiment. The controller 32 determines that the management server 5 is not provided (NO in S25), and requests the paper information detecting apparatus 4A to acquire the paper characteristic information (S27). The processing is performed by transmitting a request for acquiring the paper characteristic information from the information transmission/reception processor 311 to the paper information detecting apparatus 4A.

The processing of requesting the acquisition of paper characteristic information in Steps S26 and S27 may be performed when the environmental information of the image forming apparatus 10 itself changes or when the paper is set to be new paper type information. The paper characteristic information request execution determining unit 324 of the image forming apparatus 10 may transmit an acquisition request to the management server 5 or the paper information detecting apparatus 4A each time a job is executed, and acquire the paper characteristic information.

The image formation condition setter 323 determines whether or not the paper characteristic information has been successfully acquired from the management server 5 or the paper information detecting apparatus 4A via the information transmission/reception processor 311 (S28). When the image formation condition setter 323 can acquire the paper characteristic information (YES in S28), the image formation condition setter 323 sets an image formation condition in accordance with the acquired paper characteristic information (S29), and ends the processing. The image formation condition setter 323 may store the paper characteristic information acquired from the management server 5 or the paper information detecting apparatus 4A in the storage apparatus 33 of the image forming apparatus 10.

In contrast, when the image formation condition setter 323 cannot acquire the paper characteristic information (NO in S28), the image formation condition setter 323 sets a default image formation condition, which the image forming apparatus 10 itself holds in the ROM 32*b* or the storage apparatus 33, in accordance with, for example, the paper type information and the environmental information (S30), and ends the processing.

Even when the image formation condition setter 323 can acquire the paper characteristic information in Step S26 or S27, the paper characteristic information does not necessarily match the environmental information detected by the image forming apparatus 10 itself completely. When there is a difference in the environmental information, the image formation condition setter 323 may correct the paper characteristic information (physical property value) based on the difference between the environmental information held by the image forming apparatus 10 itself and the environmental information associated with the acquired paper characteristic information.

In the image forming system according to each of the above-described embodiments, even the image forming apparatus 10 that does not have the paper sensor 42 can set an appropriate image formation condition by acquiring recording material characteristic information suitable for the environment in which the image forming apparatus 10 is installed.

The image forming system 1 according to the first embodiment associates the environmental information acquired by the environmental information acquirer 413 with the paper type information acquired by the paper type information acquirer 414 of the paper information detecting apparatus 4 and the paper characteristic information acquired at the time when the paper information detecting apparatus 4 performs the paper information detection processing. The information manager 511 of the management server 5 associates the paper type information, the environmental information, and the paper characteristic information with each other, and stores and manages the associated information. In the image forming system 1A according to the second embodiment, the information manager 415 of the paper information detecting apparatus 4 associates the environmental information with the paper type information and the paper characteristic information, and stores and manages the associated information.

The image forming apparatus 10 that does not have the paper information detecting apparatus 4 transmits a request for acquiring paper characteristic information together with the environmental information acquired by the environmental information acquirer 322 of the image forming apparatus 10 itself, and acquires the paper characteristic information from the management server 5. At this time, the information manager 511 of the management server 5 transmits the paper characteristic information associated with the same environmental information as the environmental information received from the image forming apparatus 10 to the image forming apparatus 10.

In the image forming system 1A according to the second embodiment, the paper information detecting apparatus 4A itself associates and manages the paper characteristic information, the environmental information, and the paper type information. The image forming apparatus 10 that does not have the paper information detecting apparatus 4 transmits a request for acquiring paper characteristic information together with the environmental information acquired by the environmental information acquirer 322 of the image forming apparatus 10 itself, and acquires the paper characteristic information from the paper information detecting apparatus 4A.

As described above, in the image forming system according to each embodiment, the information manager can transmit appropriate paper characteristic information to the image forming apparatus 10. Even when there is a difference between the first environmental information and the second environmental information, the paper characteristic information associated with the first environmental information closest to the second environmental information is transmitted to the image forming apparatus 10, so that the image forming apparatus 10 can easily set an appropriate image formation condition.

Since the information manager also manages the paper type information, the environmental information and the paper characteristic information corresponding to the paper type information are transmitted to the image forming apparatus 10. The image forming apparatus 10 can further easily set an image formation condition suitable for paper to be used.

Although embodiments of the present invention have been described and illustrated in detail, the disclosed embodiments are made for purposes of illustration and example only and not limitation, and it goes without saying that various other applications and variations can be exhibited as long as the gist of the invention described in the claims is not deviated. The scope of the present invention should be interpreted by terms of the appended claims.

For example, each of the above-described embodiments describes the configurations of an apparatus and a system in detail and specifically in order to describe the invention in an easy-to-understand manner, and is not necessarily limited to those including all the described configurations. A part of the configurations of the embodiments described here can be replaced with a configuration of another embodiment. Furthermore, the configuration of another embodiment can be added to the configuration of a certain embodiment. Addition of another configuration, deletion, and replacement can be made for a part of the configuration of each embodiment.

Control lines and information lines considered to be necessary for description are indicated, and not all the control lines and information lines are indicated in a product. In practice, it can be considered that almost all configurations are interconnected.

What is claimed is:

1. An image forming system comprising:

a recording material information detecting apparatus; an image forming apparatus; and a management server, which are connected with each other via a network, wherein the recording material information detecting apparatus includes:

a first hardware processor that detects recording material characteristic information representing a characteristic of a first recording material from the first recording material; and a second hardware processor that acquires first environmental information representing an environment in which the recording material information detecting apparatus is installed, the image forming apparatus includes:

an image former that forms an image on a second recording material different from the first recording material;

a third hardware processor that acquires second environmental information representing an environment in which the image forming apparatus is installed;

a fourth hardware processor that transmits the second environmental information to the management server and requests the recording material characteristic information corresponding to the second environmental information; and a fifth hardware processor that sets an image formation condition for the image former to form the image on the second recording material based on the recording material characteristic information acquired from the management server, and the management server includes a sixth hardware processor that associates and manages the recording material characteristic information and the first environmental information received from the recording material information detecting apparatus, and, when receiving the second environmental information together with a request for acquiring the recording material characteristic information from the image forming apparatus, transmits the recording material characteristic information, which is the first environmental information corresponding to the second environmental information and associated with the first environmental information, to the image forming apparatus.

2. The image forming system according to claim 1, wherein the sixth hardware processor selects the recording material characteristic information associated with the first environmental information closest to the second environmental information.

3. The image forming system according to claim 2, wherein the sixth hardware processor selects the first environmental information closest to the second environmental information from a plurality of pieces of the first environmental information by using at least one condition of granularity and weighting, the granularity representing a range between a value of the first environmental information and a value of the second environmental information, the weighting being set in the first environmental information and the second environmental information.

4. The image forming system according to claim 1, wherein, when there is a difference between the first environmental information and the second environmental information, the sixth hardware processor corrects the second environmental information in accordance with the first environmental information, and transmits the recording material characteristic information to the image forming apparatus, the recording material characteristic information being the first environmental information corresponding to the corrected second environmental information, and associated with the first environmental information.

5. The image forming system according to claim 1, wherein, when there is a difference between the first environmental information managed by the sixth hardware processor and the second environmental information acquired by the third hardware processor, the fifth hardware processor corrects and sets the image formation condition.

6. The image forming system according to claim 1, wherein, when not managing the paper characteristic information, which is the first environmental information corresponding to the second environmental information received from the image forming apparatus and associated with the first environmental information, the sixth hardware processor notifies the image forming apparatus that the recording material characteristic information is not allowed to be acquired.

7. The image forming system according to claim 6, wherein, when notified by the sixth hardware processor that the recording material characteristic information is not allowed to be acquired, the fifth hardware processor sets a default image formation condition held by the fifth hardware processor itself.

8. The image forming system according to claim 1, wherein the first hardware processor is provided outside another image forming apparatus, and acquires the recording material characteristic information on the first recording material used in the other image forming apparatus.

9. The image forming system according to claim 1, wherein the first hardware processor is provided inside another image forming apparatus, and acquires the recording material characteristic information on the first recording material transported in the other image forming apparatus.

10. The image forming system according to claim 1, wherein the recording material information detecting apparatus includes a first recording material type information acquirer that acquires first recording material type information representing a type of the first recording material, the image forming apparatus includes a second recording material type information acquirer that acquires second recording material type information representing a type of the second recording material, and the sixth hardware processor associates and manages the first recording material type information in addition to the first environmental information and the recording material characteristic information, and, when receiving the second environmental information and the second recording material type information together with a request for acquiring the recording material characteristic information from the image forming apparatus, transmits the recording material characteristic information associated with the first recording material type information that matches the second recording material type information and the first environmental information corresponding to the second environmental information to the image forming apparatus.

11. The image forming system according to claim 10, wherein the recording material information detecting apparatus transmits the recording material characteristic information to the sixth hardware processor at timing either when the first hardware processor detects the recording material characteristic information, when the sixth hardware processor receives a request for acquiring the recording material characteristic information from the image forming apparatus, or when an environment in which the recording material information detecting apparatus is installed is changed.

12. The image forming system according to claim 10, wherein the fourth hardware processor transmits a request for acquiring the recording material characteristic information at timing either when the second recording material is housed in a recording material housing part and the second recording material type information is acquired or when the image former starts processing of forming an image on the second recording material.

13. The image forming system according to claim 1, wherein the first environmental information and the second environmental information include at least one of temperature and humidity.

14. The image forming system according to claim 1, wherein the recording material characteristic information includes one or more pieces of physical property value information detected by the first hardware processor.

15. The image forming system according to claim 14, wherein the physical property value information includes at least one of a water content, a resistance value, and rigidity of the first recording material.

16. An image forming system comprising:

a recording material information detecting apparatus; and an image forming apparatus, which are connected with each other via a network, wherein the recording material information detecting apparatus includes:

a first hardware processor that detects recording material characteristic information representing a characteristic of a first recording material from the first recording material;

a second hardware processor that acquires first environmental information representing an environment in which the recording material information detecting apparatus is installed; and a sixth hardware processor that associates and manages the recording material characteristic information and the first environmental information, and, when receiving the second environmental information representing an environment in which the image forming apparatus is installed together with a request for acquiring the recording material characteristic information from the image forming apparatus, transmits the recording material characteristic information, which is the first environmental information corresponding to the second environmental information and associated with the first environmental information, to the image forming apparatus, the image forming apparatus includes:

an image former that forms an image on a second recording material different from the first recording material;

a third hardware processor that acquires second environmental information representing an environment in which the image forming apparatus is installed;

a fourth hardware processor that transmits the second environmental information to the recording material information detecting apparatus and requests the recording material characteristic information corresponding to the second environmental information; and a fifth hardware processor that sets an image formation condition for the image former to form the image on the second recording material based on the recording material characteristic information acquired from the recording material information detecting apparatus.

17. A management server connected via a network to a recording material information detecting apparatus that detects recording material characteristic information on a first recording material and an image forming apparatus that forms an image on a second recording material different from the first recording material, the management server comprising a sixth hardware processor that associates and manages the recording material characteristic information detected by the recording material information detecting apparatus and the first environmental information representing an environment in which the recording material information detecting apparatus is installed, and, when receiving the second environmental information representing an environment in which the image forming apparatus is installed together with a request for acquiring the recording material characteristic information from the image forming apparatus, transmits the recording material characteristic information, which is the first environmental information corresponding to the second environmental information and associated with the first environmental information, to the image forming apparatus.

18. A recording material information detecting apparatus connected via a network to an image forming apparatus that forms an image on a second recording material, comprising:

a first hardware processor that detects recording material characteristic information representing a characteristic of a recording material from a first recording material different from the second recording material;

a second hardware processor that acquires first environmental information representing an environment in which the recording material information detecting apparatus is installed; and a sixth hardware processor that associates and manages the recording material characteristic information and the first environmental information, and, when receiving second environmental information representing an environment in which the image forming apparatus is installed together with a request for acquiring the recording material characteristic information from the image forming apparatus, transmits the recording material characteristic information, which is the first environmental information corresponding to the second environmental information and associated with the first environmental information, to the image forming apparatus.

* * * * *